United States Patent
Hormati (10) Patent No.: US 10,721,106 B1
(45) Date of Patent: Jul. 21, 2020

(54) ADAPTIVE CONTINUOUS TIME LINEAR EQUALIZATION AND CHANNEL BANDWIDTH CONTROL

(71) Applicant: Kandou Labs, S.A., Lausanne (CH)

(72) Inventor: Ali Hormati, Ecublens Vaud (CH)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 16/378,537

(22) Filed: Apr. 8, 2019

(51) Int. Cl.
*H04L 25/03* (2006.01)

(52) U.S. Cl.
CPC .. *H04L 25/03885* (2013.01); *H04L 25/03019* (2013.01); *H04L 25/03267* (2013.01)

(58) Field of Classification Search
CPC ......... H04L 25/03019; H04L 25/03057; H04L 25/03885; H04L 27/01
See application file for complete search history.

(56) References Cited

U.S. PATENT DOCUMENTS

| | | | |
|---|---|---|---|
| 3,636,463 A | 1/1972 | Onigkiehong |
| 3,824,494 A | 7/1974 | Wilcox |
| 3,939,468 A | 2/1976 | Mastin |
| 4,276,543 A | 6/1981 | Miller et al. |
| 4,774,498 A | 9/1988 | Traa |
| 4,897,657 A | 1/1990 | Brubaker |
| 5,017,924 A | 5/1991 | Guiberteau et al. |
| 5,459,465 A | 10/1995 | Kagey |
| 5,510,736 A | 4/1996 | Van |
| 5,748,948 A | 5/1998 | Yu et al. |
| 5,793,254 A | 8/1998 | OConnor |
| 5,945,935 A | 8/1999 | Kusumoto et al. |
| 6,226,330 B1 | 5/2001 | Mansur |
| 6,232,908 B1 | 5/2001 | Nakaigawa |
| 6,346,907 B1 | 2/2002 | Dacy et al. |
| 6,384,758 B1 | 5/2002 | Michalski et al. |
| 6,396,329 B1 | 5/2002 | Zerbe |
| 6,400,302 B1 | 6/2002 | Amazeen et al. |
| 6,462,584 B1 | 10/2002 | Proebsting |
| 6,563,382 B1 | 5/2003 | Yang |
| 6,624,699 B2 | 9/2003 | Yin et al. |
| 6,839,587 B2 | 1/2005 | Yonce |
| 6,879,816 B2 | 4/2005 | Bult et al. |
| 6,888,483 B2 | 5/2005 | Mulder |
| 6,972,701 B2 | 12/2005 | Jansson |
| 7,075,996 B2 | 7/2006 | Simon et al. |

(Continued)

FOREIGN PATENT DOCUMENTS

WO 2018052657 A1 3/2018

OTHER PUBLICATIONS

Anadigm , "Using the Anadigm Multiplier CAM", Design Brief 208, www.anadigm.com, Copyright 2002, 2002, (6 pages).

(Continued)

*Primary Examiner* — Kevin Kim
(74) *Attorney, Agent, or Firm* — Invention Mine LLC (57) ABSTRACT

Methods and systems are described for sampling an equalized information signal to generate a sequence of data-pattern-verified edge samples and data decisions, determining a correlation between each data-pattern-verified edge sample and a corresponding penultimate prior data decision of the data decisions, and adjusting, responsive to the correlation, a continuous-time linear equalization (CTLE) code of a CTLE to adjust equalization of the equalized information signal.

20 Claims, 7 Drawing Sheets

(56) References Cited

U.S. PATENT DOCUMENTS

| | | | |
|---|---|---|---|
| 7,167,523 B2 | 1/2007 | Mansur | |
| 7,188,199 B2 | 3/2007 | Leung et al. | |
| 7,199,728 B2 | 4/2007 | Dally et al. | |
| 7,269,212 B1 | 9/2007 | Chau et al. | |
| 7,285,977 B2 | 10/2007 | Kim | |
| 7,339,990 B2 | 3/2008 | Hidaka | |
| 7,372,295 B1 | 5/2008 | Wei | |
| 7,372,390 B2 | 5/2008 | Yamada | |
| 7,397,302 B2 | 7/2008 | Bardsley et al. | |
| 7,528,758 B2 | 5/2009 | Ishii | |
| 7,656,321 B2 | 2/2010 | Wang | |
| 7,683,720 B1 | 3/2010 | Yehui et al. | |
| 7,688,102 B2 | 3/2010 | Bae et al. | |
| 7,697,915 B2 | 4/2010 | Behzad et al. | |
| 7,804,361 B2 | 9/2010 | Lim et al. | |
| 7,869,497 B2 | 1/2011 | Benvenuto et al. | |
| 7,873,115 B2 | 1/2011 | Zerbe et al. | |
| 7,957,472 B2 | 6/2011 | Wu et al. | |
| 8,000,664 B2 | 8/2011 | Khorram | |
| 8,030,999 B2 | 10/2011 | Chatterjee et al. | |
| 8,106,806 B2 | 1/2012 | Toyomura et al. | |
| 8,159,375 B2 | 4/2012 | Abbasfar | |
| 8,159,376 B2 | 4/2012 | Abbasfar | |
| 8,183,930 B2 | 5/2012 | Kawakami et al. | |
| 8,472,513 B2 | 6/2013 | Malipatil et al. | |
| 8,547,272 B2 | 10/2013 | Nestler et al. | |
| 8,581,824 B2 | 11/2013 | Baek et al. | |
| 8,604,879 B2 | 12/2013 | Mourant et al. | |
| 8,643,437 B2 | 2/2014 | Chiu et al. | |
| 8,674,861 B2 | 3/2014 | Matsuno et al. | |
| 8,687,968 B2 | 4/2014 | Nosaka et al. | |
| 8,791,735 B1 | 7/2014 | Shibasaki | |
| 8,841,936 B2 | 9/2014 | Nakamura | |
| 8,860,590 B2 | 10/2014 | Yamagata et al. | |
| 9,069,995 B1 | 6/2015 | Cronie | |
| 9,083,576 B1 | 7/2015 | Hormati | |
| 9,106,465 B2 | 8/2015 | Walter | |
| 9,148,087 B1 | 9/2015 | Tajalli | |
| 9,178,503 B2 | 11/2015 | Hsieh | |
| 9,281,785 B2 | 3/2016 | Sjöland | |
| 9,292,716 B2 | 3/2016 | Winoto et al. | |
| 9,300,503 B1 | 3/2016 | Holden et al. | |
| 9,397,868 B1* | 7/2016 | Hossain | H04L 25/03057 |
| 9,438,409 B1 | 9/2016 | Liao et al. | |
| 9,520,883 B2 | 12/2016 | Shibasaki | |
| 9,571,309 B1 | 2/2017 | Sakai | |
| 9,960,902 B1* | 5/2018 | Lin | H04L 1/205 |
| 10,003,315 B2 | 6/2018 | Tajalli | |
| 10,243,614 B1* | 3/2019 | Ulrich | G06F 1/00 |
| 2001/0006538 A1 | 7/2001 | Simon et al. | |
| 2002/0050861 A1 | 5/2002 | Nguyen et al. | |
| 2002/0149508 A1 | 10/2002 | Hamashita | |
| 2002/0158789 A1 | 10/2002 | Yoshioka et al. | |
| 2002/0174373 A1 | 11/2002 | Chang | |
| 2003/0016763 A1 | 1/2003 | Doi et al. | |
| 2003/0085763 A1 | 5/2003 | Schrodinger et al. | |
| 2003/0132791 A1 | 7/2003 | Hsieh | |
| 2003/0160749 A1 | 8/2003 | Tsuchi | |
| 2003/0174023 A1 | 9/2003 | Miyasita | |
| 2003/0184459 A1 | 10/2003 | Engl | |
| 2003/0218558 A1 | 11/2003 | Mulder | |
| 2004/0027185 A1 | 2/2004 | Fiedler | |
| 2004/0169529 A1 | 9/2004 | Afghani et al. | |
| 2005/0057379 A1 | 3/2005 | Jansson | |
| 2005/0270098 A1 | 12/2005 | Zhang et al. | |
| 2006/0036668 A1 | 2/2006 | Jaussi et al. | |
| 2006/0097786 A1 | 5/2006 | Su et al. | |
| 2006/0103463 A1 | 5/2006 | Lee et al. | |
| 2006/0192598 A1 | 8/2006 | Baird et al. | |
| 2006/0194598 A1 | 8/2006 | Kim et al. | |
| 2006/0233291 A1 | 10/2006 | Garlepp et al. | |
| 2007/0009018 A1 | 1/2007 | Wang | |
| 2007/0176708 A1 | 8/2007 | Otsuka et al. | |
| 2007/0182487 A1 | 8/2007 | Ozasa et al. | |
| 2007/0188367 A1 | 8/2007 | Yamada | |
| 2007/0201546 A1 | 8/2007 | Lee | |
| 2008/0001626 A1 | 1/2008 | Bae et al. | |
| 2008/0069198 A1 | 3/2008 | Bhoja et al. | |
| 2008/0165841 A1 | 7/2008 | Wall et al. | |
| 2008/0187037 A1 | 8/2008 | Bulzacchelli et al. | |
| 2009/0090333 A1 | 4/2009 | Spadafora et al. | |
| 2009/0115523 A1 | 5/2009 | Akizuki et al. | |
| 2009/0323864 A1 | 12/2009 | Tired | |
| 2010/0020862 A1 | 1/2010 | Peng | |
| 2010/0148819 A1 | 6/2010 | Bae et al. | |
| 2010/0156691 A1 | 6/2010 | Taft | |
| 2010/0219781 A1 | 9/2010 | Kuwamura | |
| 2010/0235673 A1 | 9/2010 | Abbasfar | |
| 2010/0271107 A1 | 10/2010 | Tran et al. | |
| 2011/0028089 A1 | 2/2011 | Komori | |
| 2011/0032977 A1 | 2/2011 | Hsiao et al. | |
| 2011/0051854 A1 | 3/2011 | Kizer et al. | |
| 2011/0057727 A1 | 3/2011 | Cranford et al. | |
| 2011/0096054 A1 | 4/2011 | Cho et al. | |
| 2011/0103508 A1 | 5/2011 | Mu et al. | |
| 2011/0133816 A1 | 6/2011 | Wu et al. | |
| 2011/0156819 A1 | 6/2011 | Kim et al. | |
| 2011/0286497 A1 | 11/2011 | Nervig | |
| 2012/0025911 A1 | 2/2012 | Zhao et al. | |
| 2012/0044021 A1 | 2/2012 | Yeh et al. | |
| 2012/0082203 A1 | 4/2012 | Zerbe et al. | |
| 2012/0133438 A1 | 5/2012 | Tsuchi et al. | |
| 2012/0213267 A1 | 8/2012 | Stojanovic et al. | |
| 2012/0327993 A1 | 12/2012 | Palmer | |
| 2013/0106513 A1 | 5/2013 | Cyrusian et al. | |
| 2013/0114663 A1 | 5/2013 | Ding et al. | |
| 2013/0147553 A1 | 6/2013 | Iwamoto | |
| 2013/0195155 A1 | 8/2013 | Pan et al. | |
| 2013/0215954 A1 | 8/2013 | Beukema et al. | |
| 2013/0259113 A1 | 10/2013 | Kumar | |
| 2013/0322512 A1 | 12/2013 | Francese et al. | |
| 2013/0334985 A1 | 12/2013 | Kim et al. | |
| 2014/0119479 A1 | 5/2014 | Tajalli | |
| 2014/0176354 A1 | 6/2014 | Yang | |
| 2014/0177696 A1 | 6/2014 | Hwang | |
| 2014/0203794 A1 | 7/2014 | Pietri et al. | |
| 2014/0266440 A1 | 9/2014 | Itagaki et al. | |
| 2014/0286381 A1 | 9/2014 | Shibasaki | |
| 2014/0312876 A1 | 10/2014 | Hanson et al. | |
| 2015/0070201 A1 | 3/2015 | Dedic et al. | |
| 2015/0117579 A1 | 4/2015 | Shibasaki | |
| 2015/0146771 A1 | 5/2015 | Walter | |
| 2015/0180642 A1 | 6/2015 | Hsieh et al. | |
| 2015/0198647 A1 | 7/2015 | Atwood et al. | |
| 2015/0319015 A1 | 11/2015 | Malhotra | |
| 2016/0013954 A1 | 1/2016 | Shokrollahi et al. | |
| 2016/0056980 A1 | 2/2016 | Wang et al. | |
| 2016/0197747 A1 | 7/2016 | Ulrich et al. | |
| 2017/0019276 A1 | 1/2017 | Francese | |
| 2017/0085239 A1 | 3/2017 | Yuan et al. | |
| 2017/0104458 A1 | 4/2017 | Cohen et al. | |
| 2017/0214374 A1 | 7/2017 | Tajalli | |
| 2017/0317859 A1* | 11/2017 | Hormati | H04L 7/0087 |
| 2017/0373889 A1 | 12/2017 | Sakai | |
| 2018/0375693 A1* | 12/2018 | Zhou | H04L 7/0025 |
| 2019/0199557 A1 | 6/2019 | Taylor et al. | |

OTHER PUBLICATIONS

Hidaka, Yasuo , et al., "A 4-Channel 1.25-10.3 Gb/s Backplane Transceiver Macro With 35 dB Equalizer and Sign-Based Zero-Forcing Adaptive Control", IEEE Journal of Solid-State Circuits, vol. 44, No. 12, Dec. 2009, 3547-3559 (13 pages).

Holden, Brian , "An exploration of the technical feasibility of the major technology options for 400GE backplanes", IEEE 802.3 400GE Study Group, Geneva, CH, Jul. 16, 2013, 1-18 (18 pages).

Navid, Reza , et al., "A 40 Gb/s Serial Link Transceiver in 28 nm CMOS Technology", IEEE Journal of Solid-State Circuits, vol. 50, No. 4, Apr. 2015, 814-827 (14 pages).

Schneider, J. , et al., "ELEC301 Project: Building an Analog Computer", http://www.clear.rice.edu/elec301/Projects99/anlgcompi, Dec. 19, 1999, (9 pages).

(56) References Cited

OTHER PUBLICATIONS

Shibasaki, Takayuki, et al., "A 56-Gb/s Receiver Front-End with a CTLE and 1-Tap DFE in 20-nm CMOS", IEEE 2014 Symposium on VLSI Circuits Digest of Technical Papers, 2014, (2 pages).

Tierney, J., "A Digital Frequency Synthesizer", Audio and Electroacoustics, IEEE Transactions, pp. 48-57, vol. 19, No. 1, Abstract, Mar. 1971, (1 page).

Won, Hyosup, et al., "A 28-Gb/s Receiver With Self-contained Adaptive Equalization and Sampling Point Control Using Stochastic Sigma-Tracking Eye-Opening Monitor", IEEE Transactions on Circuits and Systems-I: Regular Papers, vol. 64, No. 3, Mar. 2017, 664-674 (11 pages).

Kim, Kyu-Young, et al., "8 mW 1.65-Gbps continuous-time equalizer with clock attenuation detection for digital display interface", Analog Integrated Circuits and Signal Processing, Kluwer Academic Publishers, vol. 63, No. 2, Oct. 11, 2009, 329-337 (9 pages).

Takahashi, Masayoshi, et al., "A 2-GHz Gain Equalizer for Analog Signal Transmission Using Feedforward Compensation by a Low-Pass Filter", IEICE Transactions on Fundamentals of Electronics, vol. E94A, No. 2, Feb. 2011, 611-616 (6 pages).

Wang, Hui, et al., "Equalization Techniques for High-Speed Serial Interconnect Transceivers", Solid-State and Integrated-Circuit Technology, 9th International Conference on ICSICT, Piscataway, NJ, Oct. 20, 2008, 1-4 (4 pages).

Palmisano, G., et al., "A Replica Biasing for Constant-Gain CMOS Open-Loop Amplifiers", Circuits and Systems, IEEE International Symposium in Monterey, CA, May 31, 1998, 363-366 (4 pages).

\* cited by examiner

ADAPTIVE CONTINUOUS TIME LINEAR EQUALIZATION AND CHANNEL BANDWIDTH CONTROL

REFERENCES

The following prior applications are herein incorporated by reference in their entirety for all purposes:

U.S. Pat. No. 9,100,232, filed Feb. 2, 2105 as application Ser. No. 14/612,241 and issued Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi].

U.S. patent application Ser. No. 15/582,545, filed Apr. 28, 2017, naming Ali Hormati and Richard Simpson, entitled "Clock Data Recovery Utilizing Decision Feedback Equalization", hereinafter identified as [Hormati].

U.S. Provisional Patent Application No. 62/684,358, filed Jun. 13, 2018, naming Kiarash Gharibdoust, entitled "Passive Multi-Input Comparator for Orthogonal Codes on a Multi-Wire Bus", hereinafter identified as [Gharibdoust].

BACKGROUND

In modern digital systems, digital information has to be processed in a reliable and efficient way. In this context, digital information is to be understood as information available in discrete, i.e., discontinuous values. Bits, collection of bits, but also numbers from a finite set can be used to represent digital information.

In most chip-to-chip, or device-to-device communication systems, communication takes place over a plurality of wires to increase the aggregate bandwidth. A single or pair of these wires may be referred to as a channel or link and multiple channels create a communication bus between the electronic components. At the physical circuitry level, in chip-to-chip communication systems, buses are typically made of electrical conductors in the package between chips and motherboards, on printed circuit boards ("PCBs") boards or in cables and connectors between PCBs. In high frequency applications, microstrip or stripline PCB traces may be used.

Common methods for transmitting signals over bus wires include single-ended and differential signaling methods. In applications requiring high speed communications, those methods can be further optimized in terms of power consumption and pin-efficiency, especially in high-speed communications. More recently, vector signaling methods such as described in [Shokrollahi] have been proposed to further optimize the trade-offs between power consumption, pin efficiency and noise robustness of chip-to-chip communication systems. In those vector signaling systems, digital information at the transmitter is transformed into a different representation space in the form of a vector codeword that is chosen in order to optimize the power consumption, pin-efficiency and speed trade-offs based on the transmission channel properties and communication system design constraints. Herein, this process is referred to as "encoding". The encoded codeword is communicated as a group of signals from the transmitter to one or more receivers. At a receiver, the received signals corresponding to the codeword are transformed back into the original digital information representation space. Herein, this process is referred to as "decoding".

Regardless of the encoding method used, the received signals presented to the receiving device are sampled (or their signal value otherwise recorded) at intervals best representing the original transmitted values, regardless of transmission channel delays, interference, and noise. This Clock and Data Recovery (CDR) not only must determine the appropriate sample timing, but must continue to do so continuously, providing dynamic compensation for varying signal propagation conditions. It is common for communications receivers to extract a receive clock signal from the received data stream. Some communications protocols facilitate such Clock Data Recovery or CDR operation by constraining the communications signaling so as to distinguish between clock-related and data-related signal components.

Similarly, some communications receivers process the received signals beyond the minimum necessary to detect data, so as to provide the additional information to facilitate clock recovery. As one example, a so-called double-baud-rate receive sampler may measure received signal levels at twice the expected data reception rate, to allow independent detection of the received signal level corresponding to the data component, and the chronologically offset received signal transition related to the signal clock component. However, the introduction of extraneous communications protocol transitions is known to limit achievable data communication rate. Similarly, receive sampling at higher than transmitted data rate is known to substantially increase receiver power utilization.

Real-world communications channels are imperfect, degrading transmitted signals in both amplitude (e.g. attenuation) and timing (e.g. delay and pulse smearing) which may be addressed via transmitter pre-compensation and/or receive equalization. Continuous time linear equalization (CTLE) is one known approach to frequency domain equalization, in one example providing compensation for increased channel attenuation at high frequencies. Time-domain-oriented equalization methods are also used to compensate for the effects of inter-symbol-interference or ISI on the received signal. Such ISI is caused by the residual electrical effects of a previously transmitted signal persisting in the communications transmission medium, so as to affect the amplitude or timing of the current symbol interval. As one example, a transmission line medium having one or more impedance anomalies may introduce signal reflections. Thus, a transmitted signal will propagate over the medium and be partially reflected by one or more such anomalies, with such reflections appearing at the receiver at a later time in superposition with signals propagating directly.

One method of data-dependent receive equalization is Decision Feedback Equalization or DFE. Here, the time-domain oriented equalization is performed by maintaining a history of previously-received data values at the receiver, which are processed by a transmission line model to predict the expected influence that each of the historical data values would have on the present receive signal. Such a transmission line model may be pre-calculated, derived by measurement, or generated heuristically, and may encompass the effects of one or more than one previous data interval. The predicted influence of these one or more previous data intervals is collectively called the DFE compensation. At low to moderate data rates, the DFE compensation may be calculated in time to be applied before the next data sample is detected, as example by being explicitly subtracted from the received data signal prior to receive sampling, or implicitly subtracted by modifying the reference level to which the received data signal is compared in the receive data sampler or comparator. However, at higher data rates the detection of previous data bits and computation of the DFE compensation may not be complete in time for the next data sample, requiring use of so-called "unrolled" DFE computations performed on speculative or potential data values rather than known previous data values. As one example, an unrolled DFE stage may predict two different compensation values depending on whether the determining data bit will resolve to a one or a zero, with the receive detector performing sampling or slicing operations based on each of those predictions, the multiple results being maintained until the DFE decision is resolved.

BRIEF DESCRIPTION

A digital receiver system samples received signals in both amplitude and time, obtaining sufficient information to permit accurate detection and decoding of the transmitted data regardless of signal degradations induced by the communications medium. Addressing the particular characteristics of the communications medium may require signal amplification, frequency- and time-domain filtering, as well as accurate adjustment of both the time and amplitude at which sampling occurs. Methods and apparatus are described that enable operational configuration and adjustment of such receive parameters to enable accurate signal reception.

Methods and systems are described for sampling an equalized information signal to generate a sequence of data-pattern-verified edge samples and data decisions, determining a correlation between each data-pattern-verified edge sample and a corresponding penultimate prior data decision of the data decisions, and adjusting, responsive to the correlation, a CTLE code of a CTLE to adjust equalization of the equalized information signal.

DETAILED DESCRIPTION

In recent years, the signaling rate of high speed communications systems have reached speeds of tens of gigabits per second, with individual data unit intervals measured in picoseconds. One example of such a system is given by [Shokrollahi], which describes use of vector signaling codes over extremely high bandwidth multiwire data communications links, such as between two integrated circuit devices in a system. Depending on the particular coding scheme used, the number of channels comprising such a communications link may range from two to eight or more, and may also communicate one or more clock signals, either within data channels or on separate communications channels.

In one embodiment utilizing a vector signaling code, multiple bits of data are encoded at the transmitter into a vector signaling "codeword", i.e. a set of symbols to be transmitted essentially simultaneously over the multiple wires or channels of the communication medium. As each such wire or channel may take on more than two possible values, each symbol of the codeword is drawn from an alphabet of allowable signal values; in examples of [Shokrollahi], alphabets of four and ten values are used in encodings of five data bits into six symbol codewords. In the receiver, the multilevel wire signals are detected to determine the received codeword, which is then decoded (e.g. by a mapping table lookup) into received data.

In an alternative embodiment, it is noted that each vector signaling codeword is a superposition of "subchannel" components, each such subchannel being an orthogonal mode or pattern of modulation of the wires or channels. Thus, in the example of [Shokrollahi], five subchannels may be summed to produce the transmitted signals, each subchannel modulated by one of the five transmitted data bits. Similarly, a vector signaling code receiver may directly detect the combination of received wire signals corresponding to a particular subchannel, as one example by using a multi-input comparator (MIC) performing a weighted summation of two or more wire signals correlated with the orthogonal mode of that subchannel, and directly producing one bit of received data. In the example of [Shokrollahi], full decoding of five data bits is shown using a set of MICs combining from two to six wire signals. As codeword and subchannel processing models are fully equivalent, interoperation is assured regardless of the particular encoding and decoding model used, e.g. allowing combination of a codeword transmitter with a MIC-based subchannel receiver based on the same orthogonal vector signaling code.

As previously mentioned, wire signals in an orthogonal vector signaling code system may take on multiple distinct values, while detected subchannel results (as one example, the results of weighted summation as at the output of a MIC) are typically binary, thus receive processing functions such as ISI reduction and skew correction may be performed more efficiently on the simpler subchannel signals rather than on the more complex wire signals.

Conventional practice for a high-speed integrated circuit receiver terminates each received signal channel, subchannel, or wire signal in a sampling device. This sampling device performs a measurement constrained in both time and amplitude dimensions; in one example embodiment, it may be composed of a sample-and-hold circuit that constrains the time interval being measured, followed by a threshold detector or digital comparator that determines whether the signal within that interval falls above or below (or in some embodiments, within bounds set by) a reference value. Alternatively, a digital comparator may determine the signal amplitude followed by a clocked digital flip-flop capturing the result at a selected time. In other embodiments, a combined time- and amplitude-sampling circuit is used, sampling the amplitude state of its input in response to a clock transition.

For descriptive convenience, this document will use the term sampling device, or more simply "sampler" to describe the receiver component that obtains an input measurement, as it implies both the time and amplitude measurement constraints, rather than the similar but less descriptive term "slicer" also used in the art. In some embodiments, the time at which a sample is captured may be adjusted in some or all of the receiver samplers; in some embodiments, the threshold level to which a sample is compared may be adjusted in some or all of the receiver samplers. As one example, the well-known receiver "eye plot" diagram is typically obtained by iterative adjustment of these parameters, with the results plotted graphically as signal amplitudes over time.

Embodiments described herein can also be applied to prior art permutation sorting methods not covered by the vector processing methods of [Shokrollahi]. More generally, embodiments may apply to any communication or storage methods, in particular those requiring coordination of multiple channels or elements of the channel to produce a coherent aggregate result.

Clock Data Recovery

Clock Data Recovery or Clock Data Alignment (CDR or CDA) circuits as in [Hormati] extract timing information, either from the data lines themselves or from dedicated clock signal inputs, and utilizing that extracted information to generate clock signals to control the time interval used by received signal sampling device. The actual clock extraction may be performed using well known circuits such as a Phase Locked Loop (PLL) or Delay Locked Loop (DLL), which in their operation may also generate higher frequency internal clocks, multiple clock phases, etc. in support of receiver operation. Implementation distinctions between CDR and CDA embodiments as described in the art are irrelevant to the present descriptions, thus the term CDA will subsequently be used herein as a generic identifier, without implying limitation.

In one common CDA embodiment, a first sample time is configured to optimally obtain the data sample, and a second sample time is configured to optimally determine whether the phase of the internal clock remains aligned with incoming signal transitions, which may be as much as ½ of a received signal unit interval (UI) offset in time from the optimum data sampling time. As sampling in such embodiments occurs twice per received unit interval, such systems are described as utilizing a double baud rate CDA. Such systems are very common in low speed communications system or where the received signal exhibits very sharp transitions, i.e. where there is significant displacement in time between observation of a signal transition and optimum sampling of data.

Receive Signal Equalization

At high data rates, even relatively short and high-quality communications channels exhibit considerable frequency-dependent signal loss, thus it is common for data receivers to incorporate receive signal equalization. Continuous-time Linear Equalization (CTLE) is commonly used to generate an equalized information signal by increasing high frequency gain (or lowering DC gain) in the receive signal path, in compensation for the increased high frequency attenuation of the channel.

It has also become common practice for data communications receivers to incorporate Decision Feedback Equalization (DFE) to compensate for signal propagation anomalies in the communications medium. The DFE system performs non-linear time-domain equalization on the received signal by maintaining a history of previously-received data values at the receiver, and processing those historic data values with a transmission line model to predict the expected influence each of the historical data values would have on the present receive signal. Such a transmission line model may be pre-calculated, derived by measurement, or generated heuristically, and may encompass the effects of one or more than one previous data interval.

In a typical receiver design, this computed DFE compensation value will be applied to the current receive signal input to produce a corrected signal more accurately representing the received data value. Those familiar with the art will recognize that the DFE compensation value produced as described above cannot be calculated until the previous unit interval's data value has been detected. Thus, as data rates increase, a point will be reached at which the information to produce the DFE compensation value is not available in time to be applied to the next unit interval sampling. Indeed, at the highest data rates currently used in practice, this situation may exist for multiple previous unit intervals, as the detection time for a single data value may represent multiple unit interval durations, requiring the receiver to pipeline or parallelize the detection operation. Thus, it is common for embodiments to forgo such "closed loop" DFE methods for one or more of the most recent unit intervals, instead relying on an "open loop" or "unrolled loop" generation of one or more elements of the DFE compensation value for these most recent unit intervals.

In an effort to accelerate such DFE operation, some embodiments speculatively produce DFE compensation values corresponding to each of the possible detected data values for a given unit interval. One embodiment incorporates multiple data detection samplers, each provided with a distinct value of DFE compensation associated with the possible detected data values for one or more previous unit intervals. The result of each sampler is stored until the previous data value is known, at which time the corresponding stored result is selected for data detection.

The set of DFE compensation values speculatively created to represent the constellation of potential detected data results over the previous transmit unit interval or intervals represent a set of measurement levels spanning some portion of the receive signal amplitude range. As an example, previous transmission of consecutive "zero" signals might lead to a predicted lower threshold level for a subsequent receiver data measurement incorporating speculative DFE compensation, while previous transmission of consecutive "one" signals might lead to a predicted higher threshold level for the same data measurement. Thus, for any data measurement used to detect an actual data value, the described multiple-sampler receiver will potentially perform measurement operations using thresholds either too high or too low for the actual signal during that interval.

CDA Combined with DFE

In very high speed communications systems operating over channels with significant frequency-dependent attenuation, received signals often have significantly sloped rise and fall times, even after receive signal equalization. Thus, a signal sampler timed to trigger at "center of eye" may under some circumstances still intersect with a signal transition still transitioning from one data value to the next, especially if that received signal is significantly perturbed by ISI. One such example may be seen in FIG. 2B, where the sampling point marked by "+" intersects with the [previous UI, current UI, subsequent UI] signal trajectory identified as [0,1,1]. A receiver incorporating DFE will compensate for this behavior by having its effective data sampling threshold adjusted to be further away from the signal trajectory, while a fixed-threshold sampler (i.e. one not obtaining the benefit of DFE) might detect an incorrect value.

In such environments, it is possible to utilize a single sample time per received unit interval to determine both data value and clock phase. These baud-rate CDA embodiments rely on the observation that certain combinations of received ISI and detection sampling threshold have sub-optimal data sampling characteristics; that is, they have a high probability of intersecting with a changing input signal having a slow rise and fall time. Thus, by controlling the receive equalization to constrain transition rates, and then restricting observation of clock timing to only those sampling thresholds and received data patterns (which correlate to particular ISI levels) that provide such intersections, a single sampling time may be utilized for both clock and data sampling.

At least one embodiment [Hormati] takes advantage of this effect to utilize measurement operations from multiple samplers or comparators performing speculative DFE operations. In this embodiment, a stored speculative result not used for determining the received data value (that is, measured at a signal offset above or below the appropriate DFE correction for that interval, but at the same time as the valid data sample) may provide information relating to clock recovery.

Operational Considerations

As may be expected, obtaining this advantageous interaction between received signal quality, equalization levels, sampling levels, and clock timing can require careful configuration of receive system parameters, as well as ongoing operational monitoring and adjustment. Moreover, as each of these parameters affects received signal quality, adjustment during receiver operation must be performed in a manner that, in both information measurement and in change to configuration or operational parameters, does not impact normal signal reception.

As a descriptive simplification, this document will hereinafter use the term "intrusive" to describe a system measurement, adjustment, or configuration change during normal operation that will or potentially may disrupt normal receiver operation or lead to detection of incorrect data values from a given signal source. Conversely, the term "non-intrusive" will describe a system measurement, adjustment, or configuration change during normal operation that may be performed without disrupting normal reception of correct data values from that signal source.

It may be costly in terms of circuit complexity and power consumption to provide accurate or real-time data about key parameters such as received signal levels. In practical embodiments, a signal sampler does not record the actual amplitude of its input, only an indication that at the time it was triggered the input value was above or below its threshold level. Thus, as one example, measuring the actual "top" or "bottom" of a signal eye requires that a sampler threshold be incrementally adjusted up or down until invalid data is produced at its output, as compared to data received by a properly adjusted data sampler. Similarly, measuring the "width" of the eye opening requires incremental advancement and postponement of a sampler clock, while comparing its sampled result to data received by a properly timed data sampler. Thus, gathering "eye graph" data is inherently a slow, intrusive, statistical procedure.

Additionally complicating these operational concerns, significant elements in most system embodiments incorporate analog processing functions that have known stability issues, in particular the sampling device itself. As component parameters such as transistor gain and threshold voltage change with temperature and variations in supply voltage, both the sampling device's threshold level and the amplitude and baseline voltage of the signal it measures may drift, requiring periodic calibration and adjustment. Moreover, process variations across an integrated circuit device may result in different samplers having different characteristics, in particular different threshold voltages and thus different sampling thresholds. Thus, many known art embodiments incorporate redundant analog processing elements, allowing one set of elements to be calibrated or adjusted, while another set is actively processing receive data. Although non-intrusive, significant duplication of power-hungry circuits such as analog amplifiers, comparators, and samplers may lead to unacceptable system power consumption, thus solutions requiring minimal circuit duplication and minimal addition of data gathering circuitry are desirable.

Example Embodiment

Figure 1:
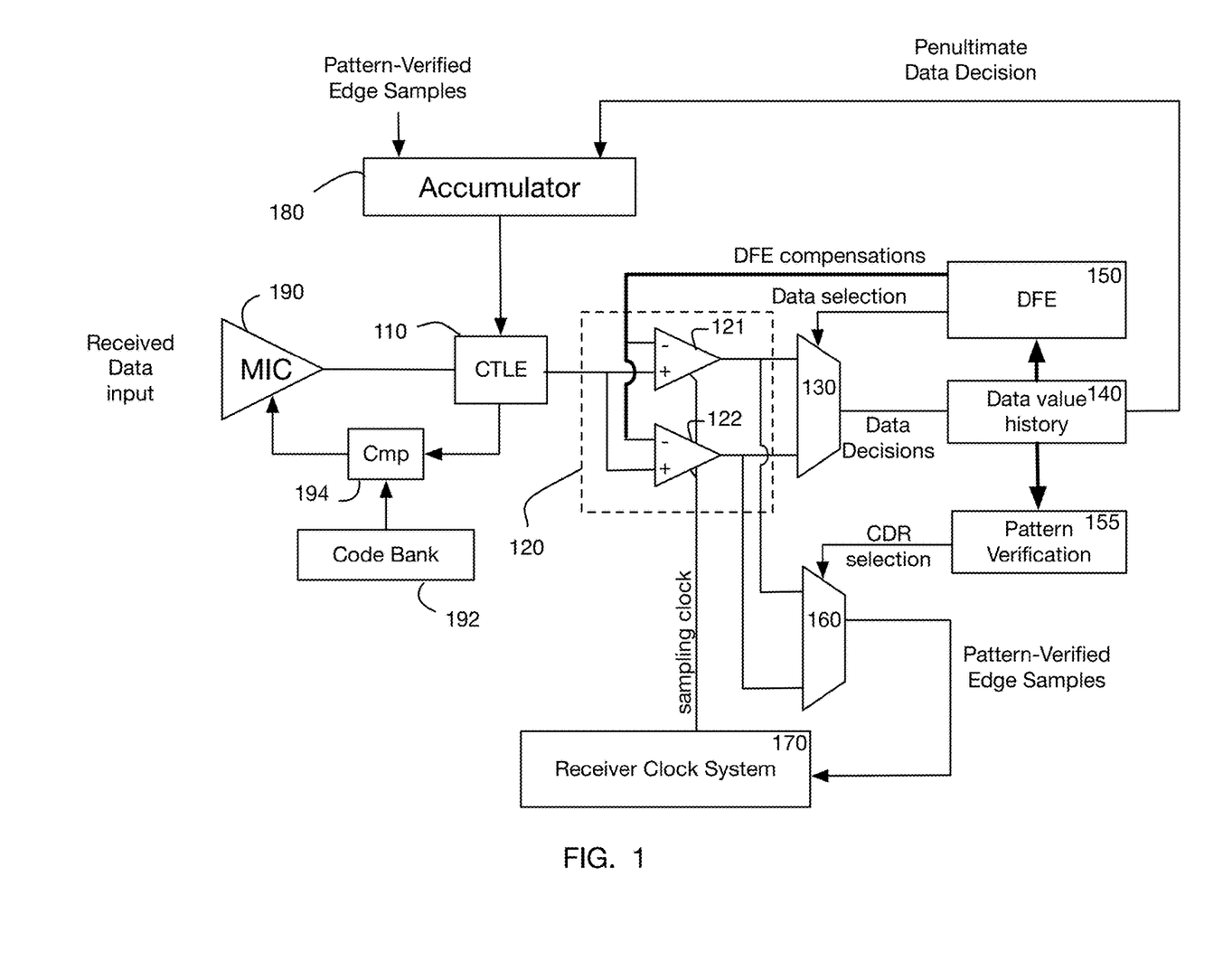
FIG. 1 is a block diagram of a receiver, in accordance with some embodiments.

For purposes of description and without implying limitation, a simple serial data receiver as shown in FIG. 1 will be used as an example. This example receiver includes at least one stage of speculative DFE 150 supported by two data samplers performing concurrent time-sampling operations at two different amplitude thresholds, and a receiver clock system 170 to produce a sampling clock, the phase of which may be adjusted by a CDR correction to optimize data sampling timing. As shown, the data samplers include comparators 120 generating comparator output slicing the signal received from CTLE 110 and sampling the comparator output according to the sampling clock. Before sampling, the received data may be amplified and/or equalized by CTLE 110 to generate an equalized information signal.

In some embodiments, an apparatus includes two comparators 120 configured to generate two comparator outputs, the two comparators configured to compare a received signal to a first threshold as at 121 and a second threshold as at 122, according to a sampling clock, the first and second thresholds determined by an estimated amount of inter-symbol interference on a multi-wire bus. The apparatus may further include a data decision selection circuit 130 configured to select one of the two comparator outputs as a data decision, the selection based on at least one prior data decision that may be stored in data value history 140. The apparatus further includes a phase-error indication selection circuit 160 configured to select one of the two comparator outputs as a phase-error indication in response to receiving a CDR selection signal from a pattern detection circuit 155 configured to identify a predetermined data decision pattern in the data value history storage 140.

In some embodiments, the apparatus further includes a receiver clock system 170 configured to receive the phase-error indication and to responsively adjust a phase of the sampling clock. In some embodiments, the phase-error indication is an early/late logic decision on a transition of the received signal. In some embodiments, the data decision selection circuit 130 and phase-error indication circuit 160 select different comparator outputs.

In some embodiments, the apparatus further includes a decision-feedback equalization (DFE) circuit 150 configured to generate the first and second decision thresholds.

In some embodiments, the apparatus further includes a sub-channel detection multi-input comparator 190 (MIC) operating on signals received via a plurality of wires, the sub-channel detection MIC 190 configured to generate the information signal. In such embodiments, the signals received via the plurality of wires correspond to symbols of a codeword of a vector signaling code, the codeword corresponding to a weighted summation of a plurality of sub-channel vectors, each sub-channel vector mutually orthogonal. In such an embodiment, the inter-symbol interference is sub-channel specific, the sub-channel specific ISI corresponding to modulation of components of a corresponding sub-channel vector associated with the received signal. In some embodiments, sub-channel specific ISI associated with each sub-channel vector is mutually orthogonal. In some embodiments, the apparatus may further include a filter configured to filter the received signal prior to generating the comparator outputs.

In some embodiments, samplers 120 of FIG. 1 include a sampler for generating data decisions of the received information signal, while another data sampler measures edge samples of the same received information signal responsive to a pattern verification 155 of prior data decisions stored in data value history 140. In some embodiments, the edge samples may be generated by performing double rate sampling, where one sampler, e.g., 121 may generate data decisions while the other sampler 122 operates according to a half-unit interval offset to generate edge samples. Alternatively, samplers 120 may operate in a baud rate mode of operation and may generate decisions at the same sampling instant, as shown in FIG. 1 according to two speculative DFE coefficients generated by DFE circuit 150. Data-pattern-verified edge samples selected via circuit 160 and penultimate prior data decisions may be analyzed using e.g., receiver clock system 170 and/or accumulator 180 to modify at least one of the comparator threshold(s), sample timing, CTLE gain, CTLE equalization, and/or channel bandwidth limiting settings e.g., via MIC 190.

Figure 2A:
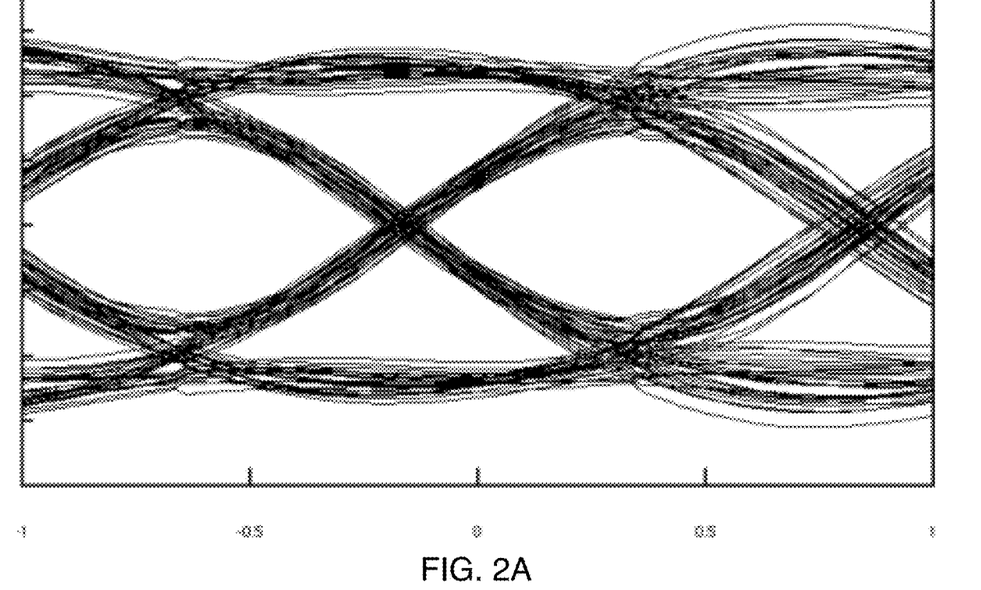
FIGS. 2A and 2B show examples of an equalized information signal as an eye diagram, in accordance with some embodiments.

FIG. 2A is an example of a typical receive signal "eye", produced by a time-overlay of the receive signal over multiple unit intervals. Thus, each individual line comprising the eye represents the receive signal "trajectory", as it passes from one unit interval to the next.

Figure 2B:
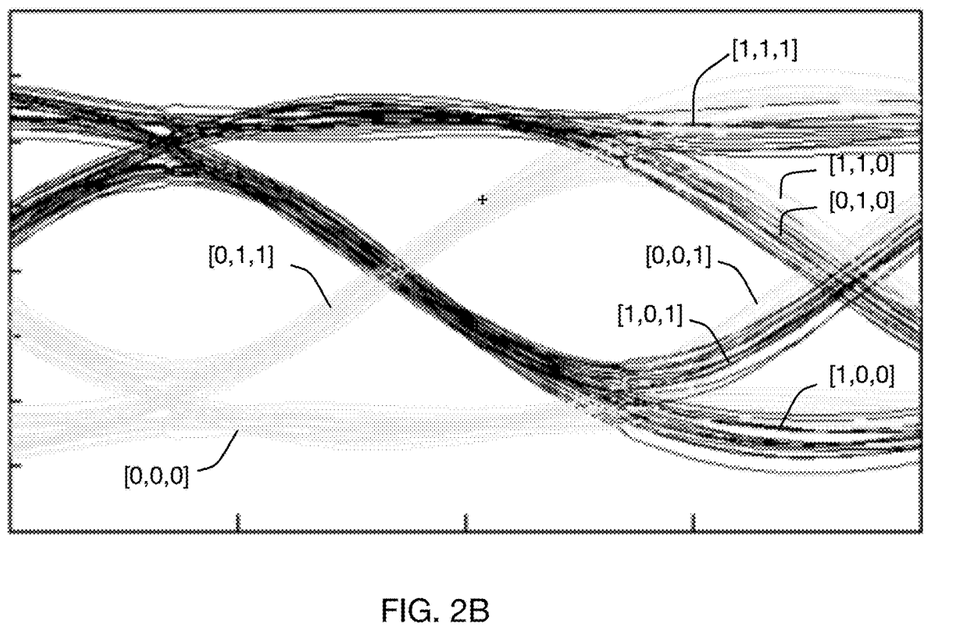

In FIG. 2B, subsets of signal trajectories comprising the eye of FIG. 2A are labeled using a triplet notation of [previous data value, current data value, subsequent data value]. As would be expected, the [1, 1, 1] trajectories are clustered along the top of the graph, the [1, 1, 0] trajectories transition downward at the right of the graph, [0, 0, 1] transition upward at the right of the graph, etc. Trajectories corresponding to a previous received data value of "1" (thus, optimally detected by the upper DFE sampling location) are shown as bold lines, while those trajectories corresponding to a previous received data value of "0" (and thus optimally detected by the lower DFE sampling location) are shown as pale lines.

The upper DFE sampler location selected by a DFE system to detect the current data value if the previous data value was "1" is shown with the symbol +. It may be noted that this sampler location is well positioned in the center of the upper data eye, but also is directly over the trajectory of a [0,1,1] received signal (the current data value of which will be detected by the lower sampler location, as determined by the previous data value of "0".) Thus, this + sampler result, unneeded for data detection of the [0,1,1] signal, may be utilized by the CDR system to determine whether the sampler timing is early or late relative to that signal transition.

In some embodiments, the signals shown in FIGS. 2A and 2B correspond to outputs of a sub-channel detection multi-input comparator (MIC) that is configured to receive a plurality of symbols of a codeword, and to detect modulations of a corresponding sub-channel vector of a plurality of sub-channel vectors, each sub-channel vector being mutually orthogonal. The codeword corresponds to a summation of the plurality of sub-channel vectors, and each sub-channel vector may be individually modulated by a corresponding information bit receive at an encoder generating the codeword. In such embodiments, the ISI seen in FIGS. 2A and 2B are sub-channel specific in that the ISI seen by the modulation of the corresponding sub-channel vector is only seen at the corresponding MIC. Thus, in a system with at least two sub-channel detection MICs, the ISI due to modulation of a first sub-channel vector is not felt at a second MIC for detecting a second sub-channel vector because the first and second sub-channel vectors are orthogonal.

Figure 2C:
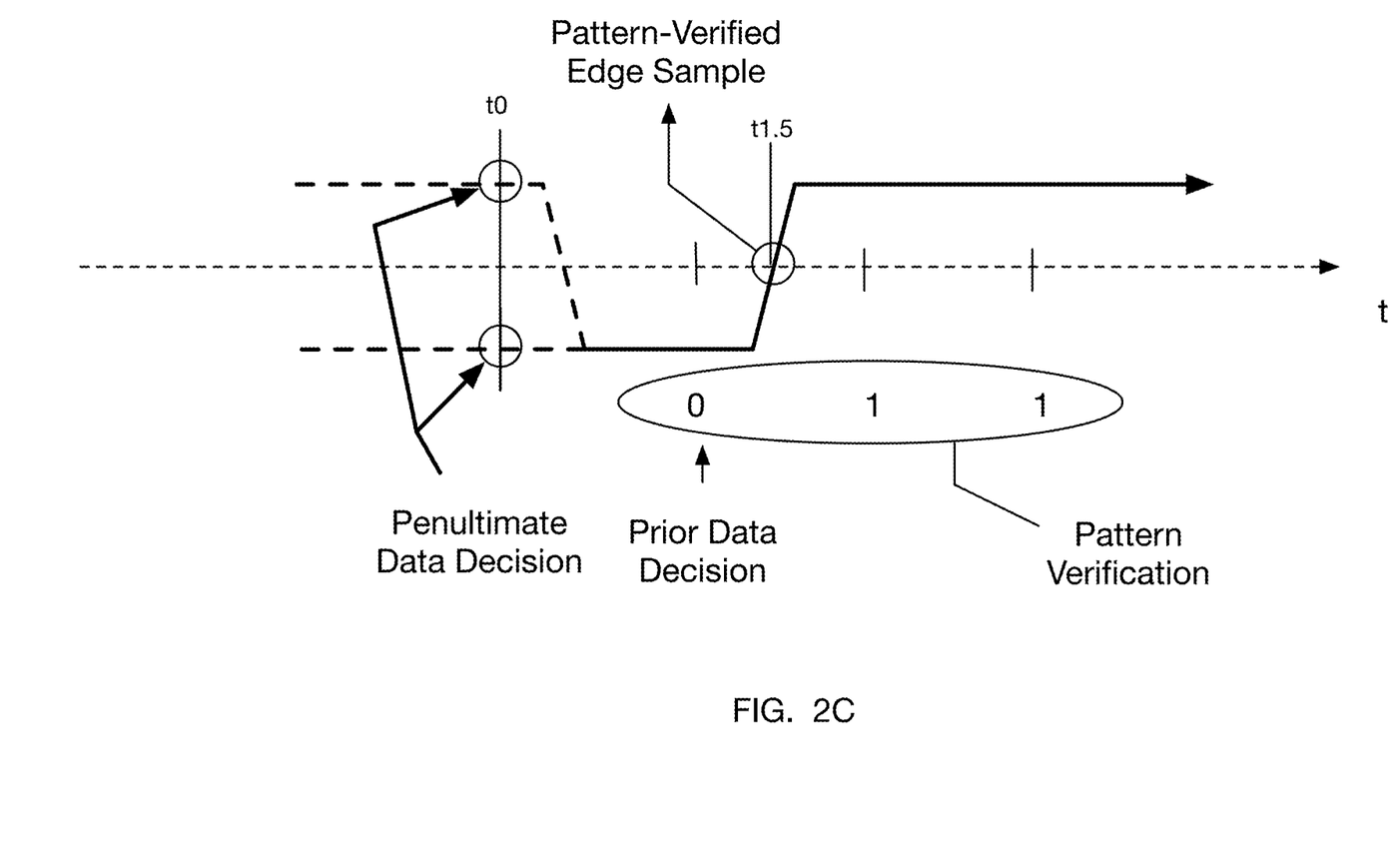
FIG. 2C illustrates sampling times of a double-rate sampling system, in accordance with some embodiments.

FIG. 2C illustrates a waveform of an information signal that is being double-rate sampled, in accordance with some embodiments. As shown, a penultimate data decision is decided at time t=0 as well as a data-pattern-verified edge sample generated at time t=1.5 unit intervals. The data decisions at times t=1, 2, and 3 are analyzed to perform pattern-verification of a valid data sequence that may be used to verify that the data-pattern-verified edge sample is valid and may be used in further operation.

Optimizing the Signal Waveform

Figure 3A:
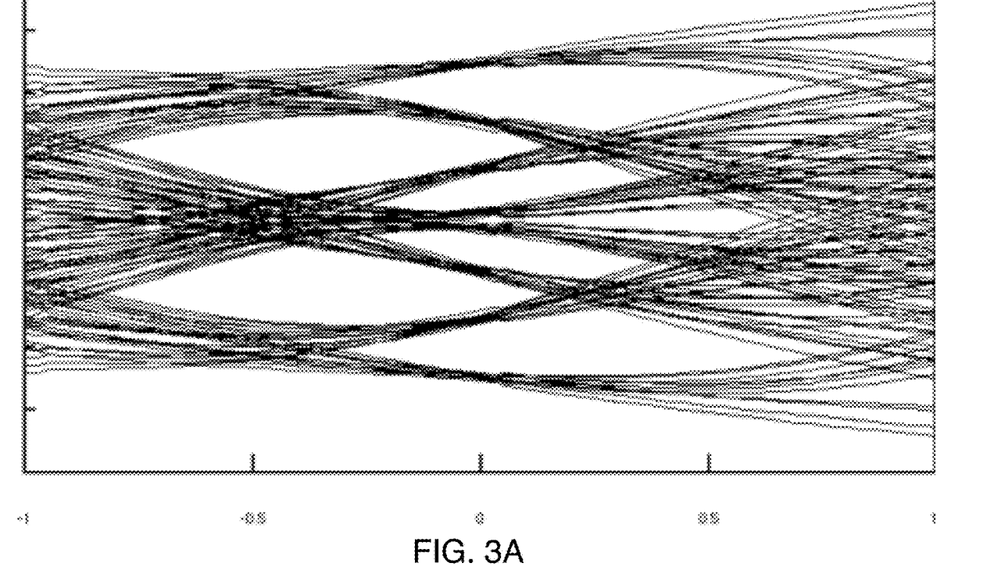
FIGS. 3A and 3B show an example of bandwidth-limited equalized information signal waveforms as an eye diagram.
Figure 3B:
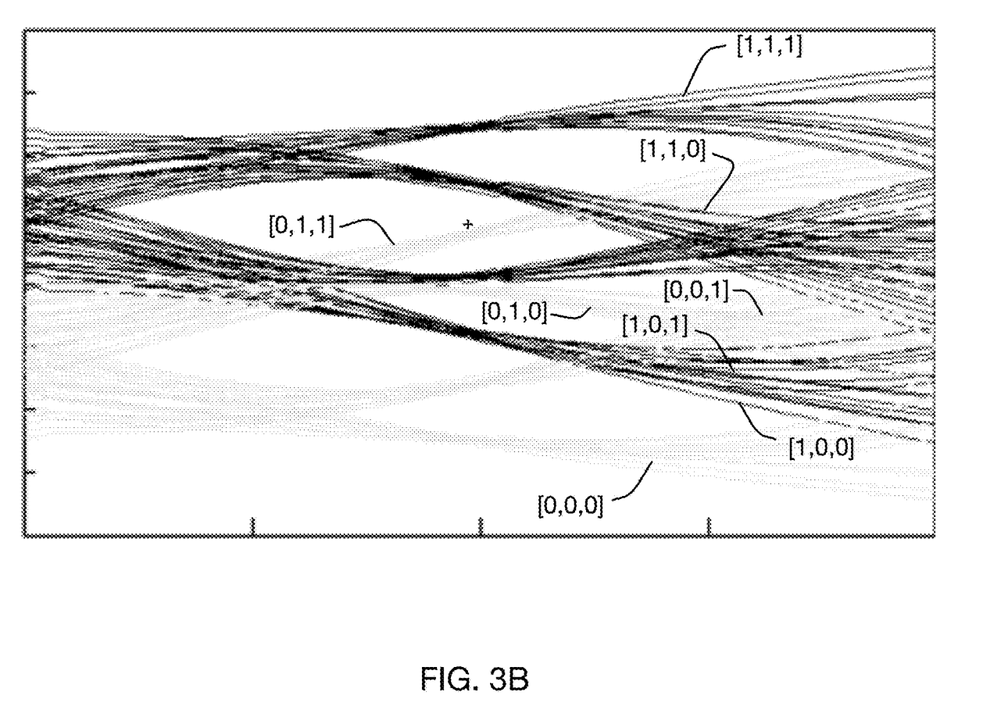

FIG. 3A shows the same signal eye as FIG. 2A but with additional low-pass filtering of the received data signal, in one example by appropriate configuration of a Continuous Time Linear Equalizer (CTLE) element in the signal path, or alternatively bandwidth adjustment of the received information signal via e.g., resistive elements in MIC 190. In FIG. 3B, subsets of signal trajectories comprising the "eye" of FIG. 3A are labeled using the same triplet notation previously described, with trajectories corresponding to a current received data value of "1" are shown in bold lines, while those trajectories corresponding to a current received data value of "0" are shown as pale lines. The sampler location selected by a DFE system to detect the current data value if the previous data value was "1" is again shown with the symbol +.

It may be seen in FIG. 3B that such frequency-dependent filtration slightly reduces the vertical eye opening for data sampling, while significantly increasing the probability that the desirable [0, 1, 1] edge trajectories intersect the sampling point. Thus, rather than prior art CDR embodiments which introduce another sampling point at a time and amplitude measurement point chosen to intersect an edge, the present embodiment modifies the received signal using frequency-dependent filtering such that a resulting signal edge intersects an existing sampling point.

Figure 4:
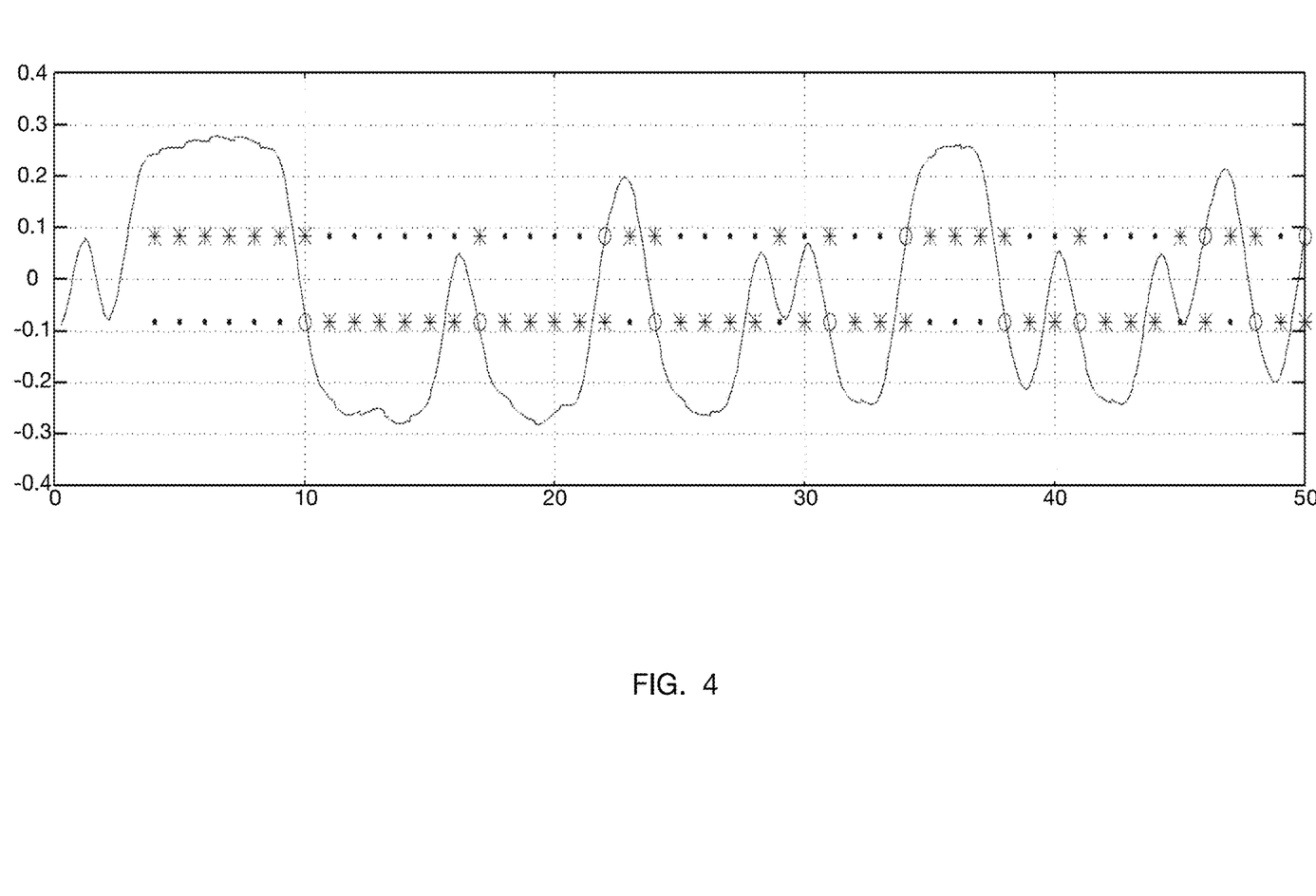
FIG. 4 is a graph of an example receive signal waveform annotated with representative sampling locations.

Continuing this example, FIG. 4 is a graph of a representative received signal waveform over 50 unit intervals, spanning an amplitude range from +0.28 to −0.28. Example thresholds as speculatively obtained from DFE are shown at +0.08 and −0.08, representing threshold values set for the two data samplers.

The useful data sampler results are graphically annotated using the symbols ∗, ○, and •, with ∗ representing a data sampler result used to obtain a data value, and • representing an unneeded data sampler result which may be ignored (i.e. the DFE predicted compensation value not corresponding to the actual data value subsequently detected. It may easily be observed that in this example the DFE system may steer selection of the current unit interval's data sampler result based on the state of the previous unit interval data value, with the current unit interval's result obtained from the upper sampler if the previous unit interval data was "1", and from the lower sampler if the previous unit interval data was "0".

The sampler results illustrated by the symbol ○ represent the interesting case where the "unneeded" result is obtained at a signal amplitude and time during which the input signal is transitioning, i.e. a signal edge. The CDR system can use these results to determine whether the sampling clock it generates is early (thus, capturing the state of the input signal before its expected transition) or late (similarly, capturing the state of the input signal after its expected transition) and as a result make an appropriate clock phase adjustment.

Further examination of FIG. 4 shows that in this example the data-pattern-verified edge sample may be identified by the triplet of [last data, current data, next data] results, with the result triplet [1, 0, 0] indicating timing information from the low-threshold slicer, and [0, 1, 1] indicating timing information from the high-threshold slicer. Such pattern verification is facilitated by the historical data values history 140 of FIG. 1, both as input to the DFE computation, and as an inevitable artifact of the pipelined or parallelized receive process typically used at the high data rates under consideration.

Thus, returning to the example embodiment of FIG. 1, data samplers 120 capture the state of the received data input at a time determined by sampling clock generated by receiver clock system 170 and at different thresholds determined by DFE compensation values produced by DFE system 150 based on data value history 140. In some embodiments, an open-loop or unrolled DFE embodiment may produce predictive compensation values used to sample a received signal, and subsequently select 130 one sampled result to obtain a data value. The series of data values so obtained are stored in a data value history 140 for use in the described computations.

As previously described, the sampled result not selected to obtain a data value may under some conditions correspond to a data-pattern-verified edge sample. Pattern verification circuit 155 is triggered when those conditions are found in the sequence of data values stored in data value history 140, selecting a sampled data value using a phase-error indication selection circuit to be used as data-pattern-verified edge sample provided to receiver clock system 170 to update a phase of the sampling clock, or to accumulator 180 to adjust the CTLE. Shaping of the analog signal characteristics of the received data input being sampled maximizes the opportunities to utilize the sampled results for clock phase correction. The frequency-dependent filtering provided by CTLE 110 and/or a bandwidth limiting setting in MIC 190 may provide such signal shaping in this example.

In a double-sampling rate embodiment, data decisions and data-pattern-verified edge samples may be generated from different samplers operating according to clocks having an offset with respect to each other. FIG. 2C illustrates various sampling instants of an information signal in a double-rate sampling embodiment. In such an embodiment, the data-pattern-verified edge sample determined at time t=1.5 may be compared to the penultimate prior data decision generated at time t=0, while data decisions at times t=1, 2, and 3 are used for pattern-verification. The penultimate prior data decision and data-pattern-verified edge sample may be provided to accumulator 180 to determine a correlation. In some embodiments, determining the correlation includes forming respective comparisons between each data-pattern-verified edge sample and the corresponding penultimate prior data decision. Such comparisons may be performed using e.g., a logical XOR gate. The comparisons may be accumulated in accumulator 180, which may include e.g., a register. The comparisons may be accumulated via a least-significant bit (LSB) position of the register, while a most-significant-bit (MSB) portion of the register provides a CTLE code for adjusting equalization of the equalized information signal. If enough of the comparisons indicate that the penultimate prior data decision and data-pattern-verified edge samples are the same, then the updates to the LSB portion of the register will propagate to the MSB portion generating the CTLE code will update Adjustment of Signal Equalization As previously described, the desirable frequency equalization of FIG. 3A vs. FIG. 2A may be obtained by adjustment of the high frequency characteristics of e.g. CTLE 115 in FIG. 1.

In at least one embodiment as shown in FIG. 1, an apparatus includes a set of samplers 120 configured to sample an equalized information signal to generate a sequence of data-pattern-verified edge samples and data decisions, an accumulator 180 configured to determine a correlation between each data-pattern-verified edge sample and a corresponding penultimate prior data decision of the data decisions and a CTLE 110 configured to adjust equalization of the equalized information signal according to a CTLE code, the CTLE code updated responsive to the determined correlation.

In some embodiments, various time-based components of the DFE correction as H1, H2, H3, are determined etc. with H1 corresponding to the correction associated with the immediately preceding receive unit interval, H2 corresponding to the unit interval preceding that one, etc. Thus, in one example baud rate embodiment, the sampling thresholds for comparators 120 are derived from the data-one and data-zero values for H1, while the remaining summation of the H2+H3+ . . . terms is applied as a DFE correction directly to the input signal prior to sampling, as examples by subtraction from the equalized information signal or, equivalently, by equal addition to both sampling thresholds for comparators 120.

In embodiments, herein, desirable frequency equalization corresponds to a minimization, ideally to zero, of the H2 term of the corresponding DFE correction, corresponding to the receive signal influence of the "penultimate" or two-before-current unit interval data value. In some embodiments, obtaining this desirable equalization directly observes the magnitude of the penultimate correction term, as one example as it is continuously computed by a DFE correction process. In the baud rate system, the penultimate correction term corresponds to the H2 correction term, whereas the double-rate sampling system aims to eliminate the effect of H1.5, due to the edge sampling offset with respect to data samples as shown in FIG. 2C. The adjustment procedure thus consists of observing the change in magnitude of the H2 correction as the amount of CTLE high frequency equalization is incrementally adjusted, ending when the H2 correction amount is minimized, ideally to zero.

In some embodiments an equivalent result is obtained by observing received patterns in the received data stream, in one example offered without implied limitation, during transmission of a training or initialization data sequence. During such an initialization procedure non-intrusive adjustment is less critical, as no production data transfer is occurring.

As previously described, "triplets" of previous data/current data/following data are used to identify CDA early/late information. This concept is here extended to include one additional previous unit interval's data, i.e. [penultimate, previous, current, subsequent], using similar decision logic. During the training or initialization procedure, the H2 term of the DFE correction is set to zero, and equalization is adjusted until data sequences including at least two preceding data values and the current data value are received correctly, this correlation being associated with a desirable equalization setting.

In the following examples, ABCD represent the values of four consecutively received data bits: the penultimate prior data decision A, its immediately following data bit B, the current receive data bit C, and the subsequent receive data bit D. Furthermore, C' corresponds to the data-pattern-verified edge sample associated with current receive data bit C. As previously described, C and C' may be obtained at the same sampling instant in the baud rate system by selecting different comparator outputs having speculative DFE correction factors applied, or alternatively C and C' may be obtained at offset sampling instants in the double-rate sampling embodiment in which one sampler samples center of eye data values and another sampler generates edge samples. One may note that the H2 term of DFE compensation relative to detection of the 'C' data value is thus associated with the penultimate prior data decision 'A', and the H1 term with the 'B' data value. The decision logic used is as follows.

| | |
|---|---|
| If(BCD equals '011' OR BCD equals '100') | ; the conditions for CDR edges |
| If(A equals C') Increase CTLE Equalization | ; bits the same, H2 is positive |
| Else Decrease CTLE Equalization | ; bits are different, H2 is negative |

Figure 5:
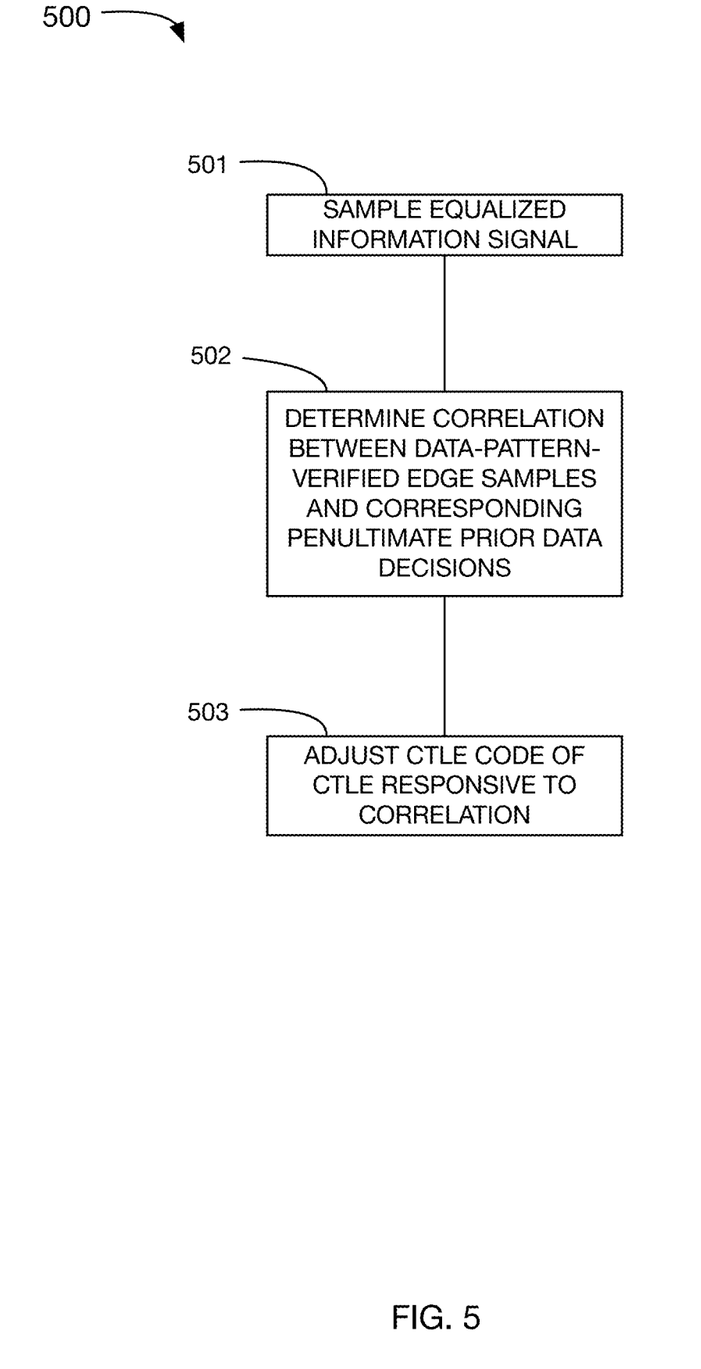
FIG. 5 is a flowchart of a method for adaptive equalization, in accordance with some embodiments.

FIG. 5 is a flow chart illustrating one embodiment of a method 500 utilizing this algorithm. As shown in FIG. 5, method 500 includes sampling 501 an equalized information signal to generate a sequence of data-pattern-verified edge samples and data decisions. In some baud rate embodiments, generating the data-pattern-verified edge samples and data decisions comprises slicing the equalized information signal against a pair of speculative DFE correction factors. Alternatively, in some double-rate sampling embodiments, the penultimate prior data decisions and data-pattern-verified edge samples are generated at offset sampling times using data-only samplers and edge-only samplers.

The method 500 further includes determining 502 a correlation between each data-pattern-verified edge sample and a corresponding penultimate prior data decision of the data decisions. Such correlations may be determined by accumulating comparisons using an accumulator 180. Some embodiments may utilize logic XOR gates to compare each data-pattern-verified edge sample to a corresponding penultimate prior data decision. If enough of the comparisons indicate that the data-pattern-verified edge sample and penultimate prior data decision are equal, a correlation between the two develops. In some embodiments, the correlation may be reflected in the development of a DFE-tap value that may correspond to the H2 correction term in DFE circuit 150. Such embodiments utilize accumulator 180 to accumulate the comparison results to adjust the H2 term.

Responsive to the determination of the correlation, a CTLE code of a CTLE is adjusted 503 to adjust equalization of the equalized information signal. In some embodiments, the CTLE code is adjusted responsive to an analysis of the developed H2 term. Alternative embodiments may directly update the CTLE code using the accumulator 180.

Baud Rate System

In the baud rate system described above, samplers 121 and 122 of FIG. 1 operate on speculative DFE correction factors and the data decision C and the data-pattern-verified edge sample C' are obtained at the same sampling instant. Furthermore, further prior DFE correction factors e.g., H2 . . . H10 are applied to the equalized information signal prior to the samplers 121 and 122. As shown in FIG. 1, DFE circuit 150 generates the H2 . . . H10 factors. In at least one embodiment, the accumulator 180 is part of DFE circuit 150, and determines the correlations between the penultimate prior data decision A and the data-pattern-verified edge sample C' based on e.g., XOR comparisons. The correlation may then be used by DFE circuit 150 to directly update the H2 DFE correction term until a correlation no longer exists (e.g., a comparison of the penultimate prior data decision A and the data-pattern-verified edge sample C' has an equally likely outcome of '1' or '0'). The CTLE code of the CTLE is responsively adjusted based on the value of the H2 term to adjust an equalization of the equalized information signal. The process may repeat until the equalized information signal has an applied equalization that results in a zero H2 term.

Double Rate Sampling System

As described above, the double rate sampling system samples the equalized information signal at center-of-eye sampling instants using one sampler, e.g., sampler 121, and generates edge samples at another sampling instant using e.g., sampler 122 according to an offset sampling clock. In such embodiments, the penultimate prior data decision A is generated 1.5 unit intervals prior to the data-pattern-verified edge sample C', yet still corresponds to a "two prior data decision" or "penultimate data decision". In at least one such double rate sampling system, the CTLE code of the CTLE is directly updated responsive to the determination of the correlation between the penultimate prior data decision A and the data-pattern-verified edge sample C'. In such embodiments, the accumulator 180 may include a hardware counting register configured to update an LSB position responsive to e.g., XOR comparisons between the penultimate prior data decision A and the data-pattern-verified edge sample C'. If there is a correlation between the penultimate prior data decision A and the data-pattern-verified edge sample C', then the LSB position of the hardware counting register will be updated in one direction more frequently than the other direction, and such updates will propagate a change to an MSB portion of the hardware counting register. The MSB portion corresponds to the CTLE code, and a distance between the MSB portion and the LSB position in the hardware counting register provides a "smoothing" or "low-pass filtering" operation.

Bandwidth Setting Adjustment

Figure 6:
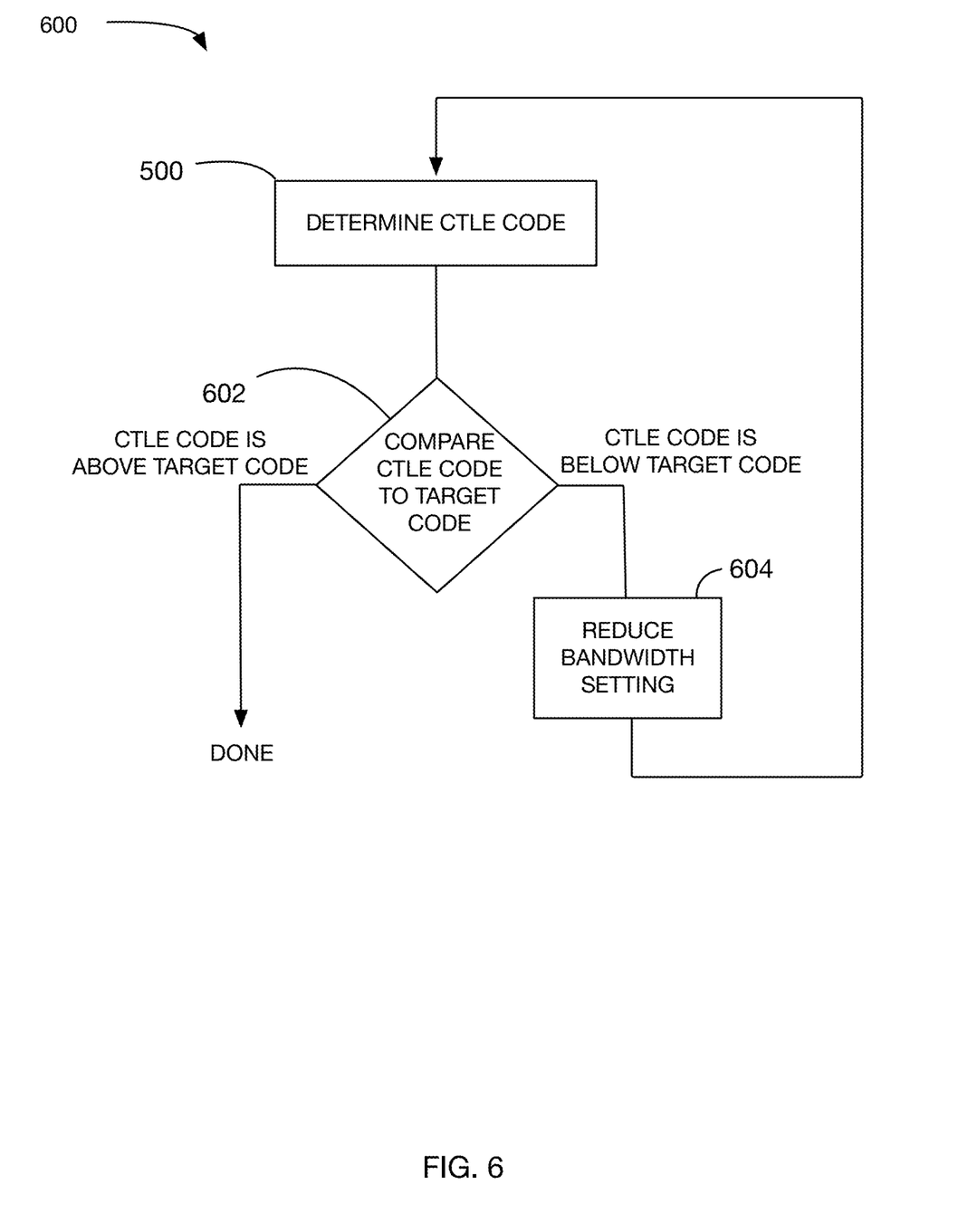
FIG. 6 is a block diagram of an embodiment of a measurement system.

In some embodiments, a channel bandwidth setting may be updated. In some scenarios, channel characteristics may be "too good", and some baud rate systems described above that rely on data-pattern-verified edge samples to perform CDR lock may lock too far left (i.e., early) in the eye. Thus, it may be advantageous to reduce the effective bandwidth of the channel, allowing the CDR to lock closer to the center of the eye. FIGS. 3A and 3B illustrate such a bandwidth limit as compared to the waveforms of FIGS. 2A and 2B. In some embodiments, once the CTLE code has been identified that zeros out the H2 correction term in the baud rate system, a further embodiment as shown in the flow chart of FIG. 6 may additionally adjust a bandwidth setting of the channel. As shown in the method 600 of FIG. 6, if the CTLE equalization code determined 500 as previously described in FIG. 5 associated with the total amount of equalization reduction determined by one of the previous methods is less as compared 602 to a target code value determined e.g., based on corner or temperature characteristics, the bandwidth setting of the channel is reduced 604, and the CTLE adjustment procedure is restarted to determine a new CTLE code. Once the equalization is high enough (and thus the DC gain reduced by a sufficient amount), then bandwidth setting is no longer updated until a subsequent calibration process. Thus, if one of the previous algorithms results in a decrease of CTLE high-frequency peaking by 6 dB versus a predetermined threshold limit of 10 dB, the corner frequency above which CTLE peaking begins will be lowered and the equalization amount algorithm run again. In some embodiments, the bandwidth setting of the channel is adjusted via resistive elements in MIC 190, which may correspond to a passive MIC as described in [Gharibdoust].

The invention claimed is:

1. A method comprising:
   sampling an equalized information signal to generate a sequence of data-pattern-verified edge samples and data decisions;
   determining a correlation between each data-pattern-verified edge sample and a corresponding penultimate prior data decision of the data decisions; and
   adjusting, responsive to the correlation, a continuous time linear equalization (CTLE) code of a CTLE to adjust equalization of the equalized information signal.

2. The method of claim 1, wherein generating the data-pattern-verified edge samples and data decisions comprises slicing the equalized information signal against a pair of speculative decision feedback equalization (DFE) correction factors.

3. The method of claim 1, further comprising generating a decision feedback equalization (DFE)-tap value based on the determined correlation, and wherein adjusting the CTLE code comprises updating the CTLE code based on the generated DFE-tap value.

4. The method of claim 3, wherein generating the DFE-tap value comprises forming respective comparisons between each data-pattern-verified edge sample and the corresponding penultimate prior data decision of the data decisions.

5. The method of claim 1, further decreasing a channel bandwidth setting responsive to a comparison of the CTLE code to a minimum equalization threshold.

6. The method of claim 5, wherein decreasing the channel bandwidth setting comprises adjusting a resistive component of an amplifier.

7. The method of claim 1, wherein determining the correlation comprises forming respective comparisons between each data-pattern-verified edge sample and the corresponding penultimate prior data decision of the data decisions.

8. The method of claim 7, wherein adjusting the CTLE code of the CTLE comprises accumulating the comparisons.

9. The method of claim 8, wherein the comparisons are accumulated in a least-significant-bit (LSB) position of a register.

10. The method of claim 9, wherein adjusting the CTLE code comprises modifying a most-significant-bit (MSB) portion responsive to accumulation of changes in the LSB position.

11. An apparatus comprising:
    a set of samplers configured to sample an equalized information signal to generate a sequence of data-pattern-verified edge samples and data decisions;
    an accumulator configured to determining a correlation between each data-pattern-verified edge sample and a corresponding penultimate prior data decision of the data decisions; and
    a continuous time linear equalizer (CTLE) configured to adjust equalization of the equalized information signal according to a CTLE code, the CTLE code updated responsive to the determined correlation.

12. The apparatus of claim 11, wherein the set of samplers is configured to generate the data-pattern-verified edge samples and data decisions by slicing the equalized information signal against a pair of speculative decision feedback equalization (DFE) correction factors.

13. The apparatus of claim 11, further comprising a decision feedback equalization (DFE) circuit configured to generate a DFE-tap value based on the determined correlation, and wherein adjusting the CTLE code comprises updating the CTLE code based on the generated DFE-tap value.

14. The apparatus of claim 13, wherein the DFE circuit is configured to generate the DFE-tap value by forming respective comparisons between each data-pattern-verified edge sample and the corresponding penultimate prior data decision of the data decisions.

15. The apparatus of claim 14, further comprising:
    a comparison circuit configured to compare the CTLE code to a minimum equalization threshold; and
    an amplifier connected to the CTLE, the amplifier having an adjustable channel bandwidth setting, the channel bandwidth setting decreased responsive to the comparison of the CTLE code to the minimum equalization threshold.

16. The apparatus of claim 15, wherein the amplifier comprises an adjustable resistive component configured to decrease the channel bandwidth setting.

17. The apparatus of claim 16, wherein the amplifier is a passive multi-input comparator.

18. The apparatus of claim 11, wherein the accumulator is configured to determine the correlation by forming respective comparisons between each data-pattern-verified edge sample and the corresponding penultimate prior data decision of the data decisions.

19. The apparatus of claim 18, wherein the accumulator is configured to accumulate the respective comparisons in a least-significant-bit (LSB) position of a register.

20. The apparatus of claim 19, wherein adjusting the CTLE code comprises modifying a most-significant-bit (MSB) portion responsive to accumulation of changes in LSB position.

* * * * *